United States Patent
Ardente et al.

(10) Patent No.: US 11,384,263 B2
(45) Date of Patent: Jul. 12, 2022

(54) ADHESIVE COMPOUND IN PARTICULAR FOR CURVED SURFACES

(71) Applicant: TESA SE, Norderstedt (DE)

(72) Inventors: Elisabetta Ardente, Hamburg (DE); Benjamin Pütz, Hamburg (DE); Markus Peters, Hamburg (DE)

(73) Assignee: TESA SE, Norderstedt (DE)

( * ) Notice: Subject to any disclaimer, the term of this patent is extended or adjusted under 35 U.S.C. 154(b) by 825 days.

(21) Appl. No.: 16/076,067

(22) PCT Filed: Jan. 23, 2017

(86) PCT No.: PCT/EP2017/051283
§ 371 (c)(1),
(2) Date: Aug. 7, 2018

(87) PCT Pub. No.: WO2017/140459
PCT Pub. Date: Aug. 24, 2017

(65) Prior Publication Data
US 2021/0179899 A1    Jun. 17, 2021

(30) Foreign Application Priority Data

Feb. 16, 2016  (DE) .................... 10 2016 202 353.5

(51) Int. Cl.
| | | |
|---|---|---|
| C09J 11/06 | (2006.01) | |
| C09J 133/02 | (2006.01) | |
| C09J 133/08 | (2006.01) | |
| C08K 5/00 | (2006.01) | |

(52) U.S. Cl.
CPC ............. *C09J 11/06* (2013.01); *C09J 133/02* (2013.01); *C09J 133/08* (2013.01); *C08K 5/0091* (2013.01); *C09J 2301/302* (2020.08); *C09J 2301/312* (2020.08)

(58) Field of Classification Search
CPC .... C09K 11/06; C09K 133/02; C09K 133/08; C09K 2301/312; C09K 2301/302; C08K 6/0091
USPC .......................................................... 525/98
See application file for complete search history.

(56) References Cited

U.S. PATENT DOCUMENTS

| | | | |
|---|---|---|---|
| 6,210,796 | B1 | 4/2001 | Lobert et al. |
| 9,475,966 | B2 * | 10/2016 | Ellringmann ........... B32B 37/18 |
| 10,233,360 | B2 * | 3/2019 | Kato ....................... C09J 133/08 |
| 10,273,387 | B2 * | 4/2019 | Saito ............................ C09J 5/00 |
| 2003/0068945 | A1 | 4/2003 | Samson-Himmelstjerna |
| 2003/0198806 | A1 | 10/2003 | Samson-Himmelstjerna et al. |
| 2005/0115664 | A1 | 6/2005 | Musahl et al. |
| 2006/0231192 | A1 | 10/2006 | Wahlers-Schmidlin et al. |
| 2008/0027179 | A1 | 1/2008 | Zollner et al. |
| 2012/0171483 | A1 | 7/2012 | Klier et al. |
| 2013/0005915 | A1 | 1/2013 | Suzuki et al. |
| 2014/0378614 | A1 * | 12/2014 | Kim ..................... G02B 5/3033 525/123 |
| 2014/0378641 | A1 | 12/2014 | Kim et al. |
| 2015/0175852 | A1 * | 6/2015 | Ellringmann ..... C08F 220/1804 156/332 |
| 2017/0174944 | A1 * | 6/2017 | Kato ........................ C09J 7/385 |

FOREIGN PATENT DOCUMENTS

| | | |
|---|---|---|
| DE | 195 35 934 C2 | 11/2002 |
| DE | 102 29 527 A1 | 1/2004 |
| DE | 103 29 994 A1 | 1/2005 |
| DE | 10 2009 031 421 A1 | 1/2011 |
| DE | 10 2013 226 714 A1 | 6/2015 |
| EP | 1 300 452 A2 | 4/2003 |
| EP | 1 302 521 A2 | 4/2003 |
| EP | 1 367 608 A2 | 12/2003 |
| EP | 1 882 707 A1 | 1/2008 |
| EP | 2 867 321 B1 | 5/2015 |
| JP | 10-204401 A | 8/1998 |
| JP | 2004-155853 A | 6/2004 |
| JP | 2009-299047 A | 12/2009 |
| JP | 2013-203854 A | 10/2013 |
| JP | 2015-525805 A | 9/2015 |
| KR | 2015-525805 A | 12/2014 |
| TW | 201311848 A1 | 3/2013 |
| WO | 02/11155 A1 | 2/2002 |
| WO | 02/18509 A1 | 3/2002 |
| WO | 2006/108871 A1 | 10/2006 |
| WO | 2014/001096 A1 | 1/2014 |
| WO | WO-2014001096 A1 * | 1/2014 ............... B41N 3/00 |
| WO | WO-2015152347 A1 * | 10/2015 ............... C08K 3/22 |
| WO | WO-2015152356 A1 * | 10/2015 ............... C09J 7/383 |
| WO | 2016/017789 A1 | 2/2016 |

OTHER PUBLICATIONS

Translation of Office Action dated Jul. 19, 2019, in connection with Japanese Patent Application No. 2018-561303.
English translation of Taiwanese Office Action corresponding to Taiwanese Application No. 106103678, dated Oct. 3, 2018.
Office Action dated Dec. 10, 2019, issued in connection with Chinese Patent Application No. 201780011826.
Office Action dated Jan. 21, 2020, issued in connection with Korean Patent Application No. 20187026761 and translation thereof.
C. Donker, PSTC Annual Technical Seminar, Proceedings, pp. 149-164, May 2001.
International Search Report dated Apr. 12, 2017.
English translation of International Search Report dated Apr. 12, 2017.
German Search Report dated Oct. 14, 2016.

* cited by examiner

*Primary Examiner* — Michael M. Bernshteyn
(74) *Attorney, Agent, or Firm* — Norris McLaughlin PA

(57) ABSTRACT

Crosslinkable adhesive compound comprising at least a first base polymer component having functional groups suitable for covalent crosslinking and for coordinative crosslinking, and comprising at least one covalent crosslinker and at least one coordinative crosslinker, wherein the coordinative crosslinker is present in molar excess in relation to the covalent crosslinker.

12 Claims, 1 Drawing Sheet

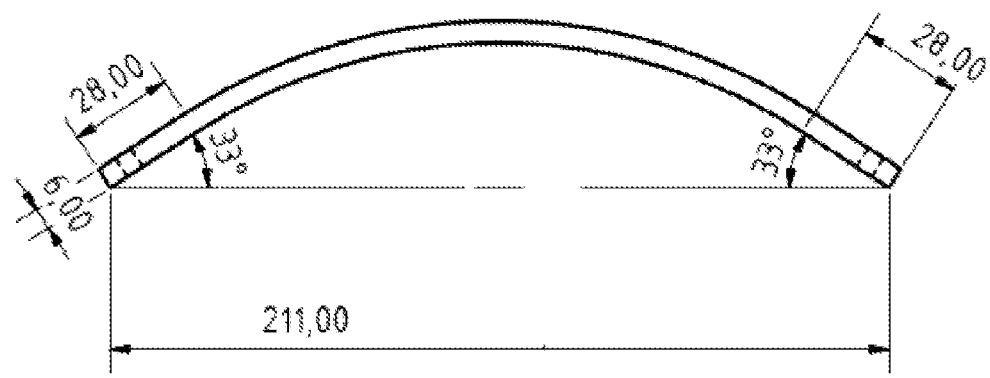
Fig. 1: The 33° NPT frame
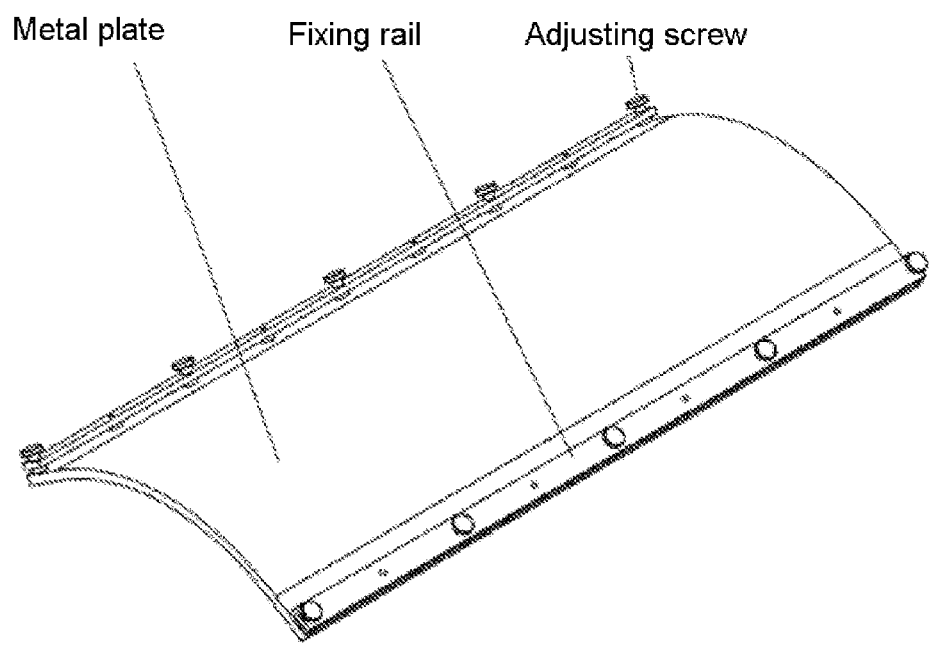
Fig. 2: Dimensions (in mm) and curvature of the metal plate of the 33° NPT frame.

ADHESIVE COMPOUND IN PARTICULAR FOR CURVED SURFACES

This is a 371 of PCT/EP2017/051283 filed 23 Jan. 2017, which claims foreign priority benefit under 35 U.S.C. 119 of German Patent Application 10 2016 202 353.5 filed Feb. 16, 2016, the entire contents of which are incorporated herein by reference.

The invention relates to a crosslinkable adhesive comprising at least one first base polymer component having functional groups suitable for covalent crosslinking and for coordinative crosslinking, and also at least one covalent crosslinker and at least one coordinative crosslinker; the invention further relates to a crosslinked pressure sensitive adhesive obtainable by crosslinking the crosslinkable adhesive.

BACKGROUND OF THE INVENTION

A pressure sensitive adhesive (PSA) requires various properties according to purpose and application. One of these properties is the capacity to hold an elastically deformed flexible article, typically in the form of a film, plastic or metal plate or foam film/plate, in its deformed shape when it tends to return into the original shape due to the exerted propulsion force (i.e., a capacity to resist the propulsion force of the article—referred to hereinafter as "repulsion resistance"—when the article is deformed elastically in order to conform to the surface contours of a bond area (which may be curved, rough, and so on). The repulsion resistance is particularly important in, for example, a double-sided PSA film which is used for fastening an article to a curved bond area.

Nowadays in the electronic industry, the fixing of components or optical lenses in the housing, consisting customarily of plastic or metal, of electronic devices, especially small portable devices such as cell phones and the like, is accomplished primarily by means of double-sided adhesive tapes. As a result of innovative design trends and technological possibilities, more and more bent or round devices are emerging. The skilled person therefore has interest in suitable and ever-better adhesives for double-sided adhesive tapes for the rounded bonding of such components with bended designs. The profile of requirements for adhesives for these applications includes a high repulsion resistance, since the components are frequently bonded with tension. Residue-free removal of the adhesives is necessary as well, in order to allow the devices to be repaired quickly and cleanly in the event of a defect.

In the printing industry there are various processes known for transferring designs by means of print originals to paper, for example. One possibility is that known as flexographic printing. In the flexographic printing process, flexible printing plates are bonded to printing cylinders or printing sleeves. Such plates consist, for example, of a polyethylene terephthalate film (PET film) on which there is a layer of a photopolymer applied into which the appropriate print relief can be introduced by means of exposure to light. The plate is then bonded to the printing cylinder or printing sleeve by way of the PET film. For the bonding, generally speaking, double-sided pressure-sensitive adhesive tapes are used, on which very stringent requirements are imposed. For the printing operation, the pressure-sensitive adhesive tape is required to have a high repulsion resistance, in order to fix the plates on the cylinder or sleeve throughout the printing operation. This must be so even at elevated temperatures of up to 50° C. and at relatively high printing speeds. In addition to this property, however, the PSA must also possess reversible adhesion properties, to allow the printing plates to be detached again after the printing operations (in that situation, the adhesive bond of the pressure-sensitive adhesive tape to the printing cylinder or printing sleeve, and also the adhesive bond to the plate, must be able to be parted without residue, in order to ensure that both components can be used again).

It is therefore rational to provide a technology for increasing the repulsion resistance without exerting any considerable influence over other properties, such as, for example, the adhesion (the pressure-sensitive adhesiveness), the cohesive strength and so on; or to provide a PSA film in which this technology is applied.

In the known prior art, PSAs are adjusted to a necessary cohesive strength with only one covalent crosslinker, used singularly, or alternatively with one coordinative crosslinker, used singularly. A combined use of these crosslinkers is unknown, at any rate in defined proportions to one another, for the purpose of establishing desired properties of the adhesive.

One object of the present invention is to provide adhesives which, particularly in the form of an adhesive layer or an adhesive film, are improved in terms of their repulsion resistance. A further objective of this invention is to provide adhesives which, particularly in the form of an adhesive layer or adhesive film, additionally to the repulsion resistance, have a good balance to a high degree of other properties, such as adhesiveness (pressure-sensitive adhesiveness), cohesive strength, and so on.

SUMMARY OF THE INVENTION

The invention relates to a crosslinkable adhesive comprising a base polymer and also at least one covalent and at least one coordinative crosslinker. Especially advantageously in accordance with the invention the crosslinkable adhesives are acrylate adhesives, more particularly pressure sensitive acrylate adhesives. For the crosslinking, at least one coordinative crosslinker and at least one covalent crosslinker are jointly used. The invention further relates, correspondingly, to a crosslinker system comprising at least one covalent and at least one coordinative crosslinker, more particularly in a defined molar ratio to one another.

The invention further relates to a crosslinked adhesive obtainable by crosslinking the crosslinkable adhesive of the invention.

Pressure sensitive adhesives (PSAs) are, in particular, polymeric compositions of a kind which—where appropriate by suitable additization with further components, such as tackifier resins, for example—at the temperature of use (unless otherwise defined, at room temperature) are permanently tacky and adhesive and adhere on contact to a multitude of surfaces, more particularly adhering immediately (exhibiting what is called "tack" [tackiness or touch-tackiness]). Even at the temperature of the use, without activation by solvent or by heat—but typically through the influence of a greater or lesser pressure—they are capable of wetting sufficiently a substrate for bonding so that interactions sufficient for the adhesion are able to develop between the composition and the substrate. Influencing parameters that are essential for this purpose include the pressure and the contact time. The particular properties of the pressure sensitive adhesives are attributable in particular, among other factors, to their viscoelastic properties. Hence, for example, weakly or strongly adhering adhesives can be produced, as can those which are bondable just once and permanently, so that the bond cannot be parted without destruction of the bonding means and/or of the substrates, or bonds which are readily redetachable and can optionally be bonded repeatedly.

Pressure sensitive adhesives may be produced in principle on the basis of polymers of a variety of chemical natures. The pressure sensitive adhesive properties are affected by factors including the nature and the proportions of the monomers used in the polymerization of the polymers forming the basis for the pressure sensitive adhesive, the average molar mass and molar mass distribution of these polymers, and also the nature and amount of the additives to the pressure sensitive adhesive, such as tackifier resins, plasticizers, and the like.

In order to achieve the viscoelastic qualities, the monomers on which the parent polymers of the pressure sensitive adhesive are based, and also any further components of the pressure sensitive adhesive that may be present, are selected in particular such that the pressure sensitive adhesive has a glass transition temperature (according to DIN 53765) below the temperature of use (that is, customarily, below room temperature).

By means of suitable cohesion-boosting measures, such as, for example, crosslinking reactions (formation of bridge-forming links between the macromolecules), it is possible to expand and/or shift the temperature range within which a polymer composition exhibits pressure sensitive adhesive properties. The range of application of the PSAs can therefore be optimized by an adjustment between flowability and cohesion of the composition.

In order to achieve desired properties for a PSA, as for example to attain sufficient cohesion of the PSAs, the adhesives are generally crosslinked, meaning that the individual macromolecules are linked to one another by bridging bonds. Crosslinking may take place in a variety of ways—there are physical, chemical or thermal methods of crosslinking.

The crosslinking of polymers refers in particular to a reaction in which numerous initially linear or branched macromolecules are linked, by formation of bridges between the individual macromolecules, to form a more or less branched network. Bridging is accomplished here in particular by reacting suitable chemical molecules—known as crosslinkers or crosslinker substances—with the macromolecules, as for example with certain functional groups of the macromolecules that are particularly amenable to attack by the respective crosslinker molecule. The positions of the crosslinker molecule that attack the macromolecules are generally referred to as "reactive centers". Crosslinker molecules may link two macromolecules to one another, by a single crosslinker molecule reacting with two different macromolecules, thus possessing, in particular, at least two reactive centers, or crosslinker molecules may also have more than two reactive centers, so that in that case a single crosslinker molecule is able to link three or more macromolecules to one another. Possible secondary reactions include intramolecular reactions, when a single crosslinker molecule attacks a single macromolecule with at least two of its reactive centers. In the sense of effective crosslinking of the polymer, such secondary reactions are generally unwanted.

A distinction can be made between two different types of crosslinkers, namely
1.) covalent crosslinkers, namely those which covalently attack the macromolecules to be linked and which therefore form a covalent chemical bond between their corresponding reactive center and the point of attack—more particularly the functional group—on the macromolecule. Suitable in principle for this purpose are all conceivable chemical reactions that form covalent bonds.
2.) coordinative crosslinkers, namely those which covalently attack the macromolecules to be linked and which therefore form a coordinative bond between their corresponding reactive center and the point of attack—more particularly the functional group—on the macromolecule. Suitable in principle for this purpose are all conceivable chemical reactions that form coordinative bonds.

DETAILED DESCRIPTION

Brief Description of the Drawings

FIG. 1 illustrates a 33° NPT frame used in the Name Plate Test

FIG. 2 illustrates the dimensions and curvature of the metal plate of the 33° NPT frame The crosslinkable adhesive of the invention consists in particular of
(a) at least one first base component having
(a1) as first polymer component, a base polymer component (also referred to below for short as base polymer) composed of a homopolymer, a copolymer, or a homogeneous mixture of two or more homopolymers, two or more copolymers, or one or more homopolymers with one or more copolymers, with at least one of the homopolymers or at least one of the copolymers, more particularly all of the polymers, of the base polymer component having functional groups for crosslinking,
(a2) optionally further constituents, homogeneously miscible with or soluble in the base polymer component, such as resins or additives, monomer residues, short-chain polymerization products (byproducts), impurities, etc.;
(b) optionally a second component having
(b1) as further polymer component, polymers substantially not homogeneously miscible with the base polymer, more particularly polymers without crosslinkable groups,
(b2) optionally further constituents substantially not homogeneously miscible with and not soluble in the base polymer, such as certain resins or additives, with component (f) in particular being wholly or partly homogeneously miscible with the optional further polymer component (b);
(c) crosslinkers, specifically
(c1) at least one covalent crosslinker,
(c2) at least one coordinative crosslinker, and
(d) optionally solvents or solvent residues.

Polymers suitable for the base polymer component (a1) for the present invention include in particular those polymers and polymer mixtures which can be crosslinked both by covalent and by coordinative crosslinkers. Such polymers are, in particular, those which have free acid groups for crosslinking.

Preferred base polymers that can be used are acrylate copolymers, more particularly those polymers (copolymers, polymer mixtures) deriving to an extent of at least 50 wt % from acrylic monomers. Comonomers selected for introducing the crosslinkable groups are copolymerizable monomers containing free acid groups; acrylic acid is used with particular preference. Monomers containing acid groups, such as acrylic acid, for example, have the property of influencing the pressure sensitive adhesive properties of the PSA. If acrylic acid is used, it is used preferably in a fraction of up to a maximum of 12.5 wt %, based on the entirety of the monomers of the base polymer component. In that case— depending on the particular amounts of crosslinker used—the amount of acrylic acid copolymerized is preferably at least such that sufficient acid groups are present to result in substantially complete reaction of the crosslinkers.

One advantageous PSA of the invention comprises as base component (a)—for the advantageous PSA of the invention, also referred to below as polyacrylate component—60 to 100 wt %, preferably 65 wt % to 80 wt %, of optionally blended acrylate copolymers (in the sense of components (a1) and (a2)), and optionally as second component (b)—for the advantageous PSA of the invention, also referred to below as elastomer component—0 to 40 wt %, preferably 15 wt % to 30 wt %, of elastomers which are substantially not homogeneously miscible with the acrylate copolymers but which optionally in turn may be blended (in the sense of the further polymer components (b1) and (b2)), the elastomers being selected more particularly in the form of one or more synthetic rubbers. The figures for the composition are based on the sum of components (a) and (b).

It has been determined that an adhesive of this kind exhibits outstanding strength and resistance properties under exposures of the kind critical for sensitive precision-mechanical, optical and/or electronic devices. In particular, the combination of high push-out strength and impact toughness requirements is often failed by the adhesives employed to date, and it is difficult to find adhesive systems for which both aspects are brought to a high level simultaneously. It is especially difficult to combine these properties further with reworkability and/or heat resistance as well.

In particular, the requirement for effective reworkability often runs counter to the requirements for permanent bonding—that is, for bonding which is not to fail at least for the period of use of the products equipped with the bonded assemblies. Adhesives which are intended to produce only temporary bonding as well, such as in the case of a temporary bond of dust and scratch protection films, which are removed again for the actual use, are required to satisfy entirely different profiles of requirements.

Homogenous mixtures are substances mixed at a molecular level, and homogeneous systems, accordingly, are single-phase systems. The substances on which they are based are referred to synonymously in the context of this specification as being "homogeneously miscible" and "compatible" with one another. Accordingly, two or more components are synonymously "not homogeneously miscible" and "not compatible" when after intimate intermingling at least two phases are formed, rather than a homogeneous system. Components are regarded as synonymously "partly homogeneously miscible", "part-compatible" and "partially compatible" if on intimate intermingling with one another (e.g., by shearing, in the melt or in solution with subsequent elimination of the solvent) they form at least two phases, equally rich in one of the components, although one or both of the phases may in each case have a greater or lesser part of the other components mixed in homogenously.

The polyacrylate component (a) of the advantageous PSA of the invention is itself preferably a homogeneous phase. The elastomer component (b) may in itself be homogeneous, or may in itself be a multiphase system, of the kind known in microphase-separated block copolymers. Polyacrylate component and elastomer component are presently selected such that—after intimate intermingling—they are substantially immiscible at 23° C. (i.e., the customary temperature of use for adhesives). "Substantially immiscible" means either that the components cannot be mixed with one another homogeneously at all, so that none of the phases contains a fraction of the second component mixed in homogeneously, or that the components have only such little part-compatibility—meaning, then, that one or both components can homogenously accommodate only such a small fraction of the respective other component that the part-compatibility is immaterial for the invention, in other words not detrimental to the teaching of the invention. The corresponding components are then regarded in the sense of this specification as being "substantially free" from the respective other component.

The advantageous adhesive of the invention is present accordingly, at least at room temperature (23° C.), in at least two-phase morphology. Very preferably the polyacrylate component and the elastomer component are substantially not homogeneously miscible in a temperature range from 0° C. to 50° C., even more preferably from −30° C. to 80° C.

Components are then defined in the sense of this specification in particular as being "substantially immiscible with one another" when the formation of at least two stable phases is detectable physically and/or chemically, with one phase being rich in one component—the polyacrylate component—and the second phase being rich in the other component—the elastomer component. A suitable analytical system for phase separation is, for example, scanning electron microscopy. Phase separation may also be detectable, for example, however, by the different phases having two glass transition temperatures independent of one another in dynamic scanning calorimetry (DSC). Phase separation exists, in accordance with the invention, when it can be unambiguously shown at least by one of the analytical methods.

The phase separation may be realized in particular such that there are discrete regions ("domains") which are rich in one component (essentially formed from one of the components and free from the other components), in a continuous matrix which is rich in the other component (essentially formed from the other component and free from the first component).

The phase separation for the adhesives used in accordance with the invention takes place in particular such that the elastomer component is present in dispersion in a continuous matrix of the polyacrylate component. The regions (domains) formed by the elastomer component are preferably substantially spherical. The regions (domains) formed by the elastomer component may also deviate from the spherical form, in particular with distortion such as, for example, orientation and elongation in the coating direction. In their greatest extent, the size of the elastomer domains is typically—but not necessarily—between 0.5 µm and 20 µm, more particularly between 1 µm and 10 µm. Other domain forms are likewise possible, as for example layer or rodlet forms, and these forms too may differ in their shape from ideal structures and may, for example, be bent or distorted.

The polyacrylate component and/or the elastomer component may each take the form of 100% systems, in other words being based exclusively on their respective polymer component ((a1) or (b1), respectively) and without further admixing of resins, additives or the like. In a further preferred way, one or both of these two components, in addition to the base polymer component, may have been admixed with further components, such as resins, for example.

In one advantageous version of the invention, the polyacrylate component and the elastomer component are composed of exclusively of their respective polymer component ((a1) or (b1), respectively), and so there are no further polymeric components present, and in particular no resins present. In a further development, the entire adhesive comprises no constituents other than the two polymer components (a1) and (b1).

The advantageous adhesives of the invention may in particular be resin-free, since frequently the polyacrylate component already itself typically has tack, and the tacky character is retained even when the elastomer component is present. Nevertheless it may be of interest to improve further the technical adhesive properties or to optimize them for specific applications, and consequently, in an advantageous further development of the invention, tackifier resins may be admixed to the adhesives.

In a further advantageous procedure, therefore, resins are added to the advantageous adhesive of the invention. Resins or tackifier resins in the sense of this specification are considered to comprise oligomeric and polymeric compounds having a number-average molar mass Mn (GPC, Test F) of typically not more than 5000 g/mol. Resin mixtures may also be employed. The predominant part of the resins in particular (based on the weight fraction in the total amount of resin), and preferably all the resins, have a softening point (ring & ball method in analogy to DIN 1427:2007; see below) of at least 80° C. and at most 150° C.

In a further advantageous procedure, the advantageous adhesive of the invention is admixed with one or more tackifier resins which can be mixed either only with the polyacrylate base polymer (a1) or only with the elastomer polymer (b1), or can be mixed into both polymer components ((a1) and (b1)), in other words being compatible or part-compatible with both polymer components. Where at least two resins are used, one portion of the resins (that is, at least one of the resins) may be selected such that it is highly miscible (compatible) with the polyacrylate base polymer (a1), but is poorly miscible or immiscible (substantially incompatible) with the elastomer polymer component (b1), and a second portion of the resins (that is, at least one second resin) may be selected such that it is highly miscible (compatible) with the elastomer polymer component (b1), but poorly miscible or immiscible (substantially incompatible) with the polyacrylate base polymer (a1).

Polymer/resin compatibility is dependent on factors including the molar mass of the polymers and of the resins. Compatibility is generally better if the molar mass(es) is or are lower. For a given polymer it may be possible that the low molecular mass constituents of the resin molar mass distribution are compatible with the polymer, while the more high molecular mass constituents are not. Such a state of affairs may result, for example, in part-compatibility.

One advantageous embodiment of the advantageous adhesive of the invention is characterized in that the adhesive comprising the polyacrylate component and the elastomer component comprises one or more resins, more particularly tackifier resins, which are compatible with the polyacrylate base polymer (a1), thus being readily miscible with the polyacrylate base polymer (a1) (and referred to below as polyacrylate-compatible (tackifier) resins). The polyacrylate-compatible (tackifier) resins may be selected such that they are not compatible with the elastomer polymer component (b1), or such that they are part-compatible with it; in the case of two or more polyacrylate-compatible (tackifier) resins, the representatives may be selected exclusively from one of these two categories or from both categories.

Polyacrylate-compatible (tackifier) resins are used very preferably in an amount such that the ratio of the polyacrylate base polymer (a1) to polyacrylate-compatible resins is in the range from 100:0 (limiting range 100:0 denotes the absence of polyacrylate-compatible resins) to 50:50, more preferably in the range from 80:20 to 60:40.

Another advantageous embodiment of the advantageous adhesive of the invention is characterized in that the adhesive comprising the polyacrylate component (a) and the elastomer component (b) comprises one or more resins, more particularly tackifier resins, which are compatible with the elastomer polymer component (b1), in other words are readily miscible with the elastomer polymer component (b1) (and are referred to hereinafter as elastomer-compatible (tackifier) resins). The elastomer-compatible (tackifier) resins may be selected such that they are not compatible with the polyacrylate base polymer (a1), or such that they are part-compatible with it. In the case of two or more elastomer-compatible (tackifier) resins, the representatives may be selected exclusively from one of these two categories or from both categories. In a very preferred procedure, the elastomer-compatible tackifier resins are substantially incompatible with the polyacrylate base polymer (a1).

Elastomer-compatible (tackifier) resins are used especially preferably in an amount such that the ratio of elastomer polymer component (a1) to elastomer-compatible (tackifier) resins is in the range from 100:0 (limiting range 100:0 denotes the absence of elastomer-compatible resins) to 50:50, preferably 70:30.

Unless anything to the contrary is stated for the variant embodiments above, in the aforementioned embodiments, aside from the stated polymer components, there may in each case additionally be nonpolymeric additives present, though it is also possible in each case to operate in the absence of such additives.

The polyacrylate component (a) of the advantageous adhesive of the invention comprises in particular one or more polyacrylate-based polymers which constitute the base polymer component (a1).

Polyacrylate-based polymers are more particularly those polymers which at least predominantly more particularly to an extent of more than 60 wt %—derive from acrylic esters and/or methacrylate acid, and also, optionally, the associated free acids, as monomers (referred to hereinafter as "acrylic monomers"). Polyacrylates are obtainable preferably by free radical polymerization. Polyacrylates may optionally include further building blocks based on further, nonacrylic copolymerizable monomers.

The polyacrylates may be homopolymers and/or, in particular, copolymers. In the sense of this invention, the term "copolymer" embraces not only those copolymers in which the comonomers used in the polymerization are incorporated purely statistically, but also those in which there are gradients in the comonomer composition and/or local accumulations of individual comonomer types and also entire blocks of one monomer in the polymer chains. Alternating comonomer sequences are also conceivable.

The polyacrylates may for example be linear, branched, star-shaped or grafted in structure, and they may be homopolymers or copolymers. The average molar mass (weight average $M_w$) of at least one of the polyacrylates in the polyacrylate base polymer, and, in the case of two or more polyacrylates present, the predominant weight fraction of the polyacrylates, more particularly of all polyacrylates present, is advantageously in the range from 250 000 g/mol to 10 000 000 g/mol, preferably in the range from 500 000 g/mol to 5 000 000 g/mol.

With particular preference the composition of the polyacrylate component is selected such that the polyacrylate component has a glass transition temperature (DSC, see below) of not more than 0° C., preferably of not more than −20° C., very preferably of not more than −40° C.

The glass transition temperature of the copolymers may advantageously be selected, through choice and quantitative composition of the components employed, such that in analogy to the Fox equation, as per equation E1

$$\frac{1}{T_G} = \sum_n \frac{w_n}{T_{G,n}} \quad \text{(E1)}$$

a suitable glass transition point $T_G$ for the polymer is produced; where n=serial number of the monomers used, $w_n$=mass fraction of the respective monomer n (wt %), and $T_{G,n}$=respective glass transition temperature of the homopolymer of the respective monomers n in K. Up to a particular upper limiting molar mass, glass transition temperatures of homopolymers may be dependent on the molar mass of the homopolymer; the reference to glass transition temperatures of homopolymers in this specification is made in relation to those polymers whose molar masses lie above this limiting molar mass, in other words in the glass transition temperature-constant range. The $T_G$ is determined after removal of the solvent, in the noncrosslinked state (in the absence of crosslinkers).

Analogously, the equation E1 may also be applied for determining and predicting the glass transition temperature of polymer mixtures. In that case, where the mixtures in question are homogeneous, n=serial number of the polymers used, $w_n$=mass fraction of the respective polymer n (wt %), and $T_{G,n}$=respective glass transition temperature of the polymer n in K.

Blending with tackifier resins generally increases the static glass transition temperature.

With particular advantage in the sense of the invention it is possible to employ random copolymers. At least one polymer kind of the polyacrylate component is based advantageously on unfunctionalized α,β-unsaturated esters. Where these esters are used for the at least one polymer in the polyacrylate component with copolymer character, it is possible in principle, as monomers in the preparation of said at least one kind of polymer, to use all compounds familiar to the skilled person as suitable for the synthesis of (meth) acrylate(co)polymers. Used preferably are α,β-unsaturated alkyl esters of the general structure $$CH_2=C(R^1)(COOR^2) \quad \text{(I)}$$

where $R^1$ is H or $CH_3$ and $R^2$ is H or linear, branched or cyclic, saturated or unsaturated alkyl radicals having 1 to 30, more particularly having 4 to 18, carbon atoms.

At least one kind of monomers for the polyacrylates of the polyacrylate component of the advantageous adhesive of the invention are monomers whose homopolymer has a glass transition temperature $T_G$ of not more than 0° C., very preferably at most −20° C. These are, in particular, esters of acrylic acid with linear alcohols having up to 10 carbon atoms or with branched alcohols having at least four carbon atoms, and esters of methacrylic acid with linear alcohols having 8 to 10 carbon atoms or with branched alcohols having at least 10 carbon atoms. Additionally, moreover, it is possible to employ monomers whose homopolymer has a glass transition temperature $T_G$ of more than 0° C. Specific examples according to the invention are preferably one or more members selected from the group encompassing Methyl acrylate, methyl methacrylate, ethyl acrylate, n-propyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, n-nonyl methacrylate, n-decyl acrylate, n-decyl methacrylate, isobutyl acrylate, isopentyl acrylate, isooctyl acrylate, isooctyl methacrylate, the branched isomers of the aforesaid compounds, such as, for example, 2-ethylhexyl acrylate, 2-ethylhexyl methacrylate, 2-propylheptyl acrylate.

It is also possible to select monomers having the tendency to form semicrystalline regions in the polymer. This behavior is found for acrylic esters and methacrylic esters with a linear alkyl radical having at least 12 carbon atoms in the alcohol residue, preferably of at least 14 carbon atoms in the alcohol residue. Here it is possible in accordance with the invention to use stearyl acrylate and/or stearyl methacrylate, for example, with particular advantage.

Other monomers which can be employed advantageously are monofunctional acrylates and/or methacrylates of bridged cycloalkyl alcohols having at least six carbon atoms in the cycloalkyl alcohol residue. The cycloalkyl alcohols may also be substituted, by $C_1$ to $C_6$ alkyl groups, halogen atoms or cyano groups, for example. Specific examples are cyclohexyl methacrylates, isobornyl acrylate, isobornyl methacrylate, and 3,5-dimethyladamantyl acrylate.

To vary the glass transition temperature it is also possible, for preparing the polyacrylates, partly, to use comonomers whose homopolymers possess a high static glass transition temperature. Suitable components are aromatic vinyl compounds, such as styrene, for example, where preferably the aromatic nuclei encompass $C_4$ to $C_{18}$ building blocks and may also contain heteroatoms. Particularly preferred examples are 4-vinylpyridine, N-vinylphthalimide, methylstyrene, 3,4-dimethyloxystyrene, 4-vinylbenzoic acid, benzyl acrylate, benzyl methacrylate, phenyl acrylate, phenyl methacrylate, t-butylphenyl acrylate, t-butylphenyl methacrylate, 4-biphenylyl acrylate and methacrylate, 2-naphthyl acrylate and methacrylate, and also mixtures of these monomers, this recitation not being exhaustive.

As comonomers to the acrylic monomers it is also possible to use further monomers which can be copolymerized with acrylic monomers, in a fraction, for example, of up to 40 wt %. Such comonomers may in principle be all compounds compatible with the acrylates and having copolymerizable double bonds, such as vinyl compounds, for instance. Such vinyl compounds may be selected wholly or partly from the group encompassing vinyl esters, vinyl ethers, vinyl halides, vinylidine halides, vinyl compounds with aromatic rings and heterocycles, especially in α-position to the double bond. Examples of comonomers suitable with particular preference are vinyl acetate, vinylformamide, vinylpyridine, ethyl vinyl ether, vinyl chloride, vinylidene chloride, acrylonitrile.

Other compounds that can be copolymerized with acrylic monomers can also be employed here, however.

For effective crosslinking it is especially advantageous if at least some of the polyacrylates have functional groups with which the crosslinkers used in accordance with the invention are able to react. Preferred for use for this purpose are monomers with acid groups, such as, for example, acrylic, sulfonic, or phosphonic acid groups, or with acid anhydride building blocks.

Particularly preferred examples of monomers for polyacrylates are acrylic acid, methacrylic acid, itaconic acid, maleic acid, fumaric acid, crotonic acid, aconitic acid, dimethylacrylic acid, β-acryloyloxypropionic acid, trichloroacrylic acid, vinylacetic acid, vinylphosphonic acid, maleic anhydride.

In one advantageous embodiment of the invention, one or more polyacrylate-compatible tackifier resins substantially compatible with the polyacrylate is or are admixed to the polyacrylate component. In this case it is possible in principle to have recourse to the tackifier resins known to be suitable for this purpose. Employed with particular preference are terpene-phenolic resins. Also possible for use for example, however, are rosrin derivatives, especially rosrin esters.

The polyacrylate-compatible resins preferably have a DACP of less than 0° C., very preferably of at most −20° C., and/or preferably an MMAP of less than 40° C., very preferably of at most 20° C. Regarding the determination of MMAP and DACP values, reference is made to C. Donker, PSTC Annual Technical Seminar, Proceedings, pp. 149-164, May 2001.

The elastomer component (6), which is substantially not compatible with the polyacrylate component, in the advantageous adhesive of the invention preferably comprises a synthetic rubber or a plurality of synthetic rubbers chosen independently of one another, and also optionally resins and/or other additives.

Block copolymers are preferred for the elastomer component. According to the invention, the synthetic rubbers are advantageously in particular those in the form of thermoplastic block copolymers, the structure of which can be represented by one of the following formulae:

A-B (II)

A-B—X(A'-B')$_n$ (III)

wherein
A or A' is a polymer formed by polymerization of a vinylaromatic compound, such as, for example, styrene or α-methylstyrene,
B or B' is a polymer of an isoprene, butadiene, a farnesene isomer or a mixture of butadiene and isoprene or a mixture of butadiene and styrene, or comprising wholly or partially ethylene, propylene, butylene and/or isobutylene,
X is an optional linking group (e.g., a radical of a coupling reagent or initiator),
n is an integer from 1 to 4,
(A'-B')$_n$ can be linked to X or to (A-B) via A' (structure IIIa) or B' (structure IIIb), preferably via B',
A can be=A' in terms of composition and/or molar mass and B can be=B' in terms of composition and/or molar mass.

Suitable vinylaromatic block copolymers comprise one or more rubber-like blocks B or B' (soft blocks, elastomer blocks) and one or more glassy blocks A or A'. In some embodiments, the block copolymer comprises at least one glassy block. In some further embodiments according to the invention, the block copolymer comprises between one and five glassy blocks.

In some advantageous embodiments, there is used in addition to the structures II, IIIa and/or IIIb or exclusively a block copolymer which is a multiarm block copolymer. This is described by the general formula

Q$_m$-Y (IV)

wherein Q represents an arm of the multiarm block copolymer and m in turn represents the number of arms, wherein m is an integer of at least 3. Y is the radical of a multifunctional linking reagent, which originates, for example, from a coupling reagent or from a multifunctional initiator. In particular, each arm Q has independently the formula A*-B*, wherein A* and B* are each chosen independently of the other arms according to the above definitions for A or A' and B or B', so that, analogously to structures II, IIIa and IIIb, A* in each case represents a glassy block and B* represents a soft block. Of course it is also possible to choose identical A*s and/or identical B*s for a plurality of arms Q or for all the arms Q.

The blocks A, A' and A* are together referred to as A blocks hereinbelow. Correspondingly, the blocks B, B' and B* are together referred to as B blocks hereinbelow.

A blocks are generally glassy blocks having a glass transition temperature (DSC, see below) which is above room temperature (room temperature is understood within the context of this invention as being 23° C.). In some advantageous embodiments, the Tg of the glassy block is at least 40° C., preferably at least 60° C., yet more preferably at least 80° C. or very preferably at least 100° C.

The vinylaromatic block copolymer further generally comprises one or more rubber-like B blocks or [soft blocks or elastomer blocks] having a Tg below room temperature. In some embodiments, the Tg of the soft block is below −30° C. or even below −60° C.

In addition to the particularly preferred monomers according to the invention mentioned for formulae II and IIIa/IIIb and IV for the B blocks, further advantageous embodiments comprise a polymerized conjugated diene, a hydrogenated derivative of a polymerized conjugated diene or a combination thereof. In some embodiments, the conjugated dienes comprise from 4 to 18 carbon atoms. Examples of further advantageous conjugated dienes for the rubber-like B blocks which may be mentioned are additionally ethylbutadiene, phenylbutadiene, piperylene, pentadiene, hexadiene, ethylhexadiene and dimethylbutadiene, wherein the polymerized conjugated dienes can be present as a homopolymer or as a copolymer.

The content of A blocks, based on the total block copolymers, is on average preferably from 10 to 40% by weight, more preferably from 15 to 33% by weight. Polystyrene is preferred as the polymer for A blocks. Preferred polymers for B blocks are polybutadiene, polyisoprene, polyfarnesene and partially or completely hydrogenated derivatives thereof, such as polyethylenebutylene, polyethylenepropylene, polyethyleneethylenepropylene or polybutylenebutadiene or polyisobutylene. Polybutadiene is very preferred.

Mixtures of different block copolymers can be used. Preference is given to the use of triblock copolymers ABA and/or diblock copolymers AB.

Block copolymers can be linear, radial or star-shaped (multiarm), also independently of the structures II and III.

Hydrocarbon resins can particularly advantageously be used as elastomer-compatible resins. Suitable tackifier resins for this class of resins are inter alia preferably hydrogenated polymers of dicyclopentadiene, non-hydrogenated, partially, selectively or completely hydrogenated hydrocarbon resins based on C5, C5/C9 or C9 monomer streams, or particularly preferably polyterpene resins based on α-pinene and/or β-pinene and/or δ-limonene. The above-mentioned tackifier resins can be used both alone and in a mixture. Ideally, it is substantially not compatible with the acrylate polymers. The aromatic portion should therefore not be chosen to be too high. Suitable tackifier resins of this class of resins are in particular compatible with the soft block or soft blocks of the elastomer component. The hydrocarbon resins of the pressure sensitive adhesive according to the invention that are compatible with the synthetic rubbers preferably have a DACP value of at least 0° C., very preferably of at least 20° C., and/or preferably an MMAP value of at least 40° C., very preferably of at least 60° C. For the determination of MMAP and DACP values, reference is made to C. Donker, PSTC Annual Technical Seminar, Proceedings, pp. 149-164, May 2001.

The hydrocarbon resins which can optionally be used within the meaning of this specification are also oligomeric and polymeric compounds having a number-average molar mass Mn of typically not more than 5000 g/mol. It is also possible to use hydrocarbon resin mixtures. In particular, the major portion of the hydrocarbon resins (based on the portion by weight in the total amount of hydrocarbon resin), preferably all the hydrocarbon resins, have a softening point of at least 80° C. and not more than 150° C. (ring & ball method analogously to DIN EN 1427:2007; see below).

The adhesive formulation can additionally also comprise tackifier resins which are liquid at room temperature, that is to say have a resin softening point below 80° C. or even below 25° C.

It is also conceivable to use aromatic hydrocarbon resins which are compatible with the A blocks. In particular such tackifier resins 2 can also be (partially) compatible with the polyacrylate component.

In an advantageous variant of the invention, in addition to polyacrylate-compatible tackifier resin(s) and/or in addition to elastomer-compatible tackifier resin(s) or alternatively to those tackifier resins, there are used one or more tackifier resins which are compatible with both components or which are compatible with one component and partially compatible with the other component.

For example, it is possible to use one or more polyacrylate-compatible adhesive resins which are at least partially compatible or completely miscible with the elastomer component. If thermoplastic block copolymers are used as the elastomer component, as described above, the polyacrylate-compatible tackifier resins used can be at least partially compatible or completely miscible with the A blocks and/or the B blocks of the elastomer component.

For example, it is also possible to use one or more tackifier resins which are compatible with the elastomer component and at least partially compatible with the polyacrylate component. If thermoplastic block copolymers are used as the elastomer component, as described above, the polyacrylate-compatible tackifier resins used can be miscible with the A blocks and/or the B blocks of the elastomer component.

In a very preferred approach, the crosslinkers of component (c) can be mixed homogeneously into the base component, optionally after prior dissolution in suitable solvents.

Employed as covalent crosslinkers (component (c1)) with the present invention in one preferred version of the invention are glycidylamines. Examples of representatives particularly preferred in accordance with the invention include N,N,N',N'-tetrakis(2,3-epoxypropyl)cyclohexane-1,3-dimethylamine and N,N,N',N'-tetrakis(2,3-epoxypropyl)-m-xylene-a,a'-diamine.

As covalent crosslinkers it is also possible, advantageously, to use polyfunctional epoxides, especially epoxycyclohexylcarboxylates. Particular examples here would include 2,2-bis(hydroxymethyl)-1,3-propanediol or (3,4-epoxycyclohexane)methyl 3,4-epoxycyclohexylcarboxylate.

It is possible in accordance with the invention, moreover, to use polyfunctional aziridines. To that end an example includes trimethylolpropane tris(2-methyl-1-aziridinepropionate).

Covalent crosslinkers used in another preferred version of the invention are isocyanates, more particularly polyfunctional isocyanate compounds. As polyfunctional isocyanate compound it is possible for example to use tolylene diisocyanate (TDI), 2,4-tolylene diisocyanatedimer, naphthylene 1,5-diisocyanate (NDI), o-tolylene diisocyanate (TODI), diphenylmethane diisocyanate (MDI), triphenylmethane triisocyanate, tris(p-isocyanatophenyl) thiophosphite and polymethylenepolyphenyl isocyanate. They can be used alone or in a combination of two or more kinds thereof.

In accordance with the invention at least one covalent crosslinker is used, though it is also possible for two or more covalent crosslinkers to be employed, such as, for example, the two aforementioned diamine compounds in combination with one another.

Suitable coordinative crosslinkers (component (c2)) for the present invention include, in particular, chelate compounds, more particularly polyvalent metal chelate compounds. The term "polyvalent metal chelate compound" refers to those compounds wherein a polyvalent metal is bonded coordinatively to one or more organic compounds. Polyvalent metal atoms which can be used are Al(III), Zr(IV), Co(II), Cu(I), Cu(II), Fe(II), Fe(III), Ni(II), V(II), V(III), V(IV), V(V), Zn(II), In(III), Ca(II), Mg(II), Mn(II), Y(III), Ce(II), Ce(IV), St(II), Ba(II), Mo(II), Mo(IV), Mo(VI), La(III), Sn(II), Sn(IV), Ti(IV) and the like. Of these, Al(III), Zr(IV), and Ti(IV) are preferred.

Ligands of the coordinative crosslinkers may in principle be all known ligands thereof. The atoms utilized for the coordinative bonding of the organic compound may, however, in particular be those atoms which have free electron pairs, such as, for example, oxygen atoms, sulfur atoms, nitrogen atoms, and the like. Examples of organic compounds which can be utilized are alkyl esters, alcohol compounds, carboxylic acid compounds, ether compounds, ketone compounds, and the like. An illustrative listing would include more particularly titanium chelate compounds such as titanium dipropoxide bis(acetylacetonate), titanium dibutoxide bis(octyleneglycolate), titanium dipropoxide bis(ethylacetoacetate), titanium dipropoxide bis(lactate), titanium dipropoxide bis(triethanolaminate), titanium di-n-butoxide bis(triethanolaminate), titanium tri-n-butoxide monostearate, butyl titanate dimer, poly(titanium acetylacetonate), and the like; aluminum chelate compounds such as aluminum diisopropoxide monoethylacetate, aluminum di-n-butoxide monomethylacetoacetate, aluminum diisobutoxide monomethylacetoacetate, aluminum di-n-butoxide monoethylacetoacetate, aluminum di-sec-butoxide monoethylacetoacetate, aluminum triacetylacetonate, aluminum triethylacetoacetonate, aluminum monoacetylacetonate bis(ethylacetoacetonate), and the like; and zirconium chelate compounds such as zirconium tetraacetylacetonate and the like. Of these, aluminum triacetylacetonate and aluminum dipropoxide are preferred. They can be used alone or in a combination of two or more kinds thereof.

Covalent crosslinkers are used preferably in a total amount of 0.015 to 0.04, preferably 0.02 to 0.035 part by weight, based on 100 parts by weight of the base polymer component (a1), very preferably in an amount of 0.03 wt %. Coordinative crosslinkers are used preferably in an amount of 0.03 to 0.15, preferably 0.04 to 0.1 part by weight, based on 100 parts by weight of the base polymer component (a1).

With further preference, covalent crosslinkers and coordinative crosslinkers are used such that the coordinative crosslinkers are present in a molar excess, based on the covalent crosslinkers. The crosslinkers are preferably employed in the quantitative ranges stated above, and specifically such that the molar ratio of covalent crosslinkers to coordinative crosslinkers—that is, the ratio of the amount of substance $n_{cov}$ of the covalent crosslinkers used to the amount of substance $n_{coord}$ of the coordinative crosslinkers used—is in the range from 1:1.3 to 1:4.5, correspondingly $1.3 \leq n_{coord}/n_{cov} \leq 4.5$. Very preferred is a molar ratio of covalent crosslinkers to coordinative crosslinkers of 1:2 to 1:4.

The adhesive, more particularly PSA, may be confined to the aforesaid constituents (base polymer and crosslinkers); besides the base polymer and the crosslinkers, however, it may also include further constituents, more particularly the admixtures known in principle to the skilled person. Through such constituents it is possible in particular for desired properties of the resultant adhesive, more particularly PSA, to be deliberately influenced and adjusted. Further components and/or additives may be added to the adhesive in each case alone or in combination with one, two or more other additives or components.

In one preferred approach, the adhesive is admixed with resins, such as tackifier resins and/or thermoplastic resins. The maximum amount of resin which can be added is limited by the miscibility with the polymers—optionally blended with further starting materials; preferably a homogeneous mixture ought to be formed between resin and polymers.

Tackifying resins which can be used are the tackifier resins known in principle to the skilled person. Examples include pinene resins, indene resins, and also rosins, their disproportionated, hydrogenated, polymerized, esterified derivatives and salts, the aliphatic and aromatic hydrocarbon resins, terpene resins and terpene-phenol resins, and also $C_5$, $C_9$ and other hydrocarbon resins, in each case individually or in combination with one another. With particular advantage it is possible to employ all resins that are compatible with (soluble in) the polymer composition, with reference being made in particular to all aliphatic, aromatic, alkylaromatic hydrocarbon resins, hydrocarbon resins based on pure monomers, hydrogenated hydrocarbon resins, functional hydrocarbon resins, and natural resins.

Additionally it is possible optionally for
plasticizers (plasticizing agents)—such as low molecular mass polyacrylates, phthalates, water-soluble plasticizers, plasticizing resins, phosphates or polyphosphates, for example—,
functional additives, such as initiators, accelerators,
electrically conductive materials, such as conjugated polymers, doped conjugated polymers, metal pigments, metal particles, metal salts, metal-coated particles— e.g. silver-coated beads—, graphite, conductive carbon blacks, carbon fibers, ferromagnetic additives, etc.,
foaming agents, blowing agents, expandable hollow beads,
low-flammability fillers such as ammonium polyphosphate, for example, —
compounding agents, nucleating agents
aging inhibitors—in the form, for example, of primary and secondary antioxidants light stabilizers, ozone protectants,
pulverulent and granular fillers, dyes, and pigments such as, for example, fibers, carbon blacks, zinc oxides, titanium dioxides, chalks ($CaCO_3$), silicas, silicates, solid or hollow glass beads, solid or hollow polymer beads, solid or hollow ceramic beads, microbeads made of other materials,
organic fillers
alone or in any desired combination of two or more additives to have been added.

The polymers are prepared in particular by radical polymerization, preferably in solution. After the polymerization, a preferred procedure entails removal of the solvent from the polymerization product. The crosslinkers and/or the other adjuvants may be added before or after the removal of the solvent, their addition taking place preferably while still in the solution phase.

The residual solvent fraction is to be lowered to a proportion of not more than 5 wt %, more particularly not more than 2 wt %, very particularly not more than 0.5 wt %, based on the mixture remaining after removal of the solvent. The preferred objective is a solvent-free system.

The solvent removed is preferably supplied to a recycling operation. The solvent as used to prepare the reaction solution may be taken entirely or partly from a recycling operation. With particular advantage the solvent is wholly or partly circulated, meaning that the solvent removed after a polymerization is used wholly or partly for preparing a reaction solution for a further polymerization.

The invention further relates to a crosslinked pressure sensitive adhesive obtainable by crosslinking a crosslinkable adhesive of the invention as set out above. This crosslinking takes place preferably on a pressure sensitive adhesive shaped to form a layer or to form a film.

The crosslinking reaction here may proceed in particular as follows:

In one advantageous approach, the two substances, as the pure substance or in predissolved form in a suitable solvent, are added to the polymer, which is present in solution, and then the polymer is thoroughly mixed with the crosslinkers, and the mixture is coated onto a temporary or permanent carrier by the customary coating techniques, after which the coating is dried under suitable conditions (removal of the solvent), during which the crosslinking takes place.

In an optional approach suitable in particular for highly reactive systems, one of the crosslinkers is first added, in pure form or in predissolved form, to the polymer solution. The second crosslinker is not supplied until shortly before coating takes place, and is supplied, for example, via an in-line metering system with downstream active or static mixer and subsequent coating and drying.

The pot life (working time) of the coordinative crosslinkers may be extended by adding the above-described ligands to the polymer-crosslinker solution. The ligand excess is then removed in the course of the drying; only from that point are the coordinative crosslinkers (fully) reactive.

The drying conditions (temperature and residence time) are very preferably selected such that not only is the solvent removed but also the crosslinking is completed to a great extent, so that a stable crosslinking level—particularly at higher temperatures—is achieved. In particular, the adhesive is crosslinked completely. Complete crosslinking of an adhesive is understood in accordance with the invention to mean that the maximum shear travel "max" thereof in the microshear travel test (method D; see experimental section of this specification), under the conditions specified therein, on repeated (daily, for example) microshear travel measurement, changes only within the bounds of the accuracy of the measurement method (approximately up to a maximum of 5%) within a period of 48 hours when the adhesive is stored at room temperature (23° C.) under otherwise standard conditions.

Verification of complete crosslinking may be accomplished, depending on the field of application of the adhesive, for other temperatures as well (e.g. 40° C., more particularly those temperatures corresponding to the respective application temperatures).

The invention further relates to adhesive tapes and adhesive films comprising at least one layer of a pressure sensitive adhesive of the invention, more particularly of a crosslinked pressure sensitive adhesive of the invention. Suitable adhesive tapes include single-sided adhesive tapes, where the layer of the PSA of the invention is provided in particular on one side of a carrier layer (with direct contact or indirectly), and also double-sided adhesive tapes, in which case there is a layer of a PSA provided on the two sides of a carrier layer, in each case in direct contact or indirectly. At least one of the layers of adhesive of a double-sided adhesive tape of the invention is in that case a PSA of the invention, and it is also possible for both layers of adhesive of the double-sided adhesive tape of the invention to be adhesives of the invention, which in turn may again be identical or different, in terms of their thickness or specific chemical composition, for instance. Single- or double-sided adhesive tapes may have further layers, as is known in principle from the prior art.

The invention also embraces a carrier-less adhesive tape, consisting only of the layer of the PSA of the invention and, optionally, temporarily applied liner materials which are removed again for the application.

The adhesive products of the invention find a multiplicity of applications, as for example in the construction industry, in the electronics industry, in the home and hobby sector, in the auto industry, in ship, boat, and railroad construction, for household appliances, furniture, and the like. Examples of advantageous applications are the bonding of trim strips and badges in the aforesaid sectors, the bonding of stiffening profiles in elevators, the bonding of components and products in the solar industry, frame bonding in electronic consumer goods, such as televisions and the like, and bonds associated with signage production.

The adhesive of the invention and the adhesive tapes of the invention are outstandingly suitable for bonding flexible printing plates to curved surfaces. In the flexographic printing process, flexible printing plates are bonded to printing cylinders or printing sleeves. Such plates consist, for example, of a polyethylene terephthalate film (PET film) on which a layer of a photopolymer is applied, into which the appropriate print relief can be introduced by exposure to light. The bonding of the plates on the printing cylinder or printing sleeve then takes place by way of the PET film.

The pressure-sensitive adhesive tapes of the invention outstandingly meet the very exacting requirements in this area. For the printing operation, the pressure-sensitive adhesive tape is required to have a certain hardness, but also a certain elasticity. Moreover, the peel adhesion should be sufficient to ensure that the printing plate does not detach from the double-sided pressure sensitive adhesive tape, or the pressure sensitive adhesive tape from the cylinder or the sleeve. This is to be the case, for example, even at elevated temperatures of 40 to 60° C. and at relatively high printing speeds. In addition to this property, however, the PSA is also to possess reversible adhesion properties, in order to allow the printing plates to be detached again after the printing operations (where not only the adhesive bond of the pressure-sensitive adhesive tape to the print cylinder or print sleeve but also the bond to the plate must be amenable to residue-free parting, in order to ensure that both components can be reused). This detachability ought also to be the case after bonding over a relatively long time period (up to six months). It is desirable, moreover, that the pressure sensitive adhesive tape and in particular the printing plate can be removed again without destruction thereof, i.e., without substantial application of force, since in general the printing plates are used more than once. Moreover, there should be no residues left on the printing plate or on the cylinder or sleeve. In summary, therefore, very exacting requirements are imposed on the double-sided pressure sensitive adhesive tapes suitable for this utility, and these requirements are fulfilled outstandingly by the PSA of the invention.

The adhesive can be used advantageously for bonding components of precision-mechanical, optical, electrical and/or electronic devices, such as during production, repair, decoration or the like of said devices, for example. Here is it possible for example for materials such as plastics, glasses, metals, and the like to be bonded.

In particular, the adhesive is also suitable for the permanent adhesive bonding of flexible materials, in particular in the production of flexible displays. Such displays are becoming increasingly important.

Advantageously, the adhesive can be used for the adhesive bonding of windows or lenses in casings of precision-mechanical, optical and/or electronic devices (so-called "lens mounting"). At least one of the rigid or flexible substrates here is transparent or translucent. The transparent or translucent substrate can be, for example, a window or an optical lens for the purpose of protecting sensitive components arranged therebeneath—such components can be, for example, liquid-crystal displays (LCD), light-emitting diodes (LED) or organic light-emitting diodes (OLED) of displays, but also printed circuits or other sensitive electronic components; this is very important, for example, in the case of use for touch-sensitive displays—and/or for bringing about optical effects for the functioning of the device—for example light refraction, light focusing, light attenuation, light amplification, etc.

Very advantageously, the transparent substrate is so chosen that it has a haze value of not more than 50%, preferably of not more than 10%, very preferably of not more than 5% (measured according to ASTM D 1003). The second substrate is preferably likewise a component of a precision-mechanical, optical and/or electronic device. In particular, casings of such devices or mounts for windows or lenses as described above come into consideration here.

In a preferred approach, the transparent or translucent substrate is a substrate of glass, polymethyl methacrylate and/or polycarbonate.

In particular, the second substrate can be made of plastics materials such as acrylonitrile-butadiene-styrene copolymers (ABS), polyamide or polycarbonate, which in particular can also be glass fiber reinforced; or made of metals, such as aluminum—also anodized aluminum—or magnesium and metal alloys.

It is also possible to add to the substrate materials additives, such as, for example, dyes, light stabilizers, anti-aging agents, plasticizers or the like, provided that this is advantageous for the intended use; in the case of transparent or translucent materials in particular, provided that it does not interfere with those optical properties or interferes with them only negligibly.

According to the invention, the composite according to the invention is thus a component of an electronic, optical or precision-mechanical device.

Electronic, optical and precision-mechanical devices within the meaning of this application are in particular devices that are to be classified in class 9 of the international classification of goods and services for the registration of marks (Nice Classification); 10th edition (NCL(10-2013)), insofar as they are electronic, optical or precision-mechanical devices, as well as timepieces and chronometric instruments according to class 14 (NCL(10-2013)), such as in particular scientific, nautical, surveying, photographic, cinematographic, optical, weighing, measuring, signaling, checking, life-saving and teaching apparatus and instruments apparatus and instruments for conducting, switching, transforming, accumulating, regulating and controlling electricity image recording, processing, transmission and reproduction devices, such as, for example, televisions and the like acoustic recording, processing, transmission and reproduction devices, such as, for example, radios and the like computers, calculators and data processing devices, mathematical devices and instruments, computer accessories, office equipment—such as, for example, printers, fax machines, copiers, word processors—, data storage devices remote communication devices and multifunctional devices with a remote communication function, such as, for example, telephones, answering machines chemical and physical measuring devices, control devices and instruments, such as, for example, battery chargers, multimeters, lamps, tachometers nautical devices and instruments optical devices and instruments medical devices and instruments and those for athletes timepieces and chronometers solar cell modules, such as, for example, electrochemical dye-sensitized solar cells, organic solar cells, thin-film cells, fire-extinguishing devices.

Technical development is increasingly being directed at such devices, which are being made increasingly smaller and lighter so that their owner is able to take them with him at any time, and usually regularly does take them with him. This is conventionally effected by achieving lower weights and/or a suitable size for such devices. Within the scope of this specification, such devices are also referred to as mobile devices or portable devices. As part of this development trend, precision mechanical and optical devices are increasingly (also) being provided with electronic components, which increases the possibilities for minimization. Because mobile devices are carried, they are exposed to increased— in particular mechanical—stresses, for example by hitting edges, by being dropped, by contact with other hard objects in a bag, but also as a result of the permanent movement due to their being carried. However, mobile devices are also exposed to greater stresses due to the influence of moisture, temperature influences and the like than "immobile" devices, which are usually installed in internal spaces and are not or are scarcely moved. The adhesive used according to the invention has particularly preferably been found to withstand and, in an ideal case, also attenuate or compensate for such disturbing influences.

Some portable devices are listed below, by way of example.

cameras, digital cameras, photographic accessories (such as exposure meters, flashguns, diaphragms, camera casings, lenses, etc.), film cameras, video cameras microcomputers (portable computers, hand-held computers, hand-held calculators), laptops, notebook computers, netbooks, ultrabooks, tablet computers, handhelds, electronic diaries and organizers (so-called "electronic organizers" or "personal digital assistants", PDA, palmtops), modems computer accessories and operating units for electronic devices, such as mice, drawing pads, graphics tablets, microphones, loudspeakers, games consoles, gamepads, remote controls, remote operating devices, touchpads monitors, displays, screens, touch-sensitive screens (sensor screens, touchscreen devices), projectors reading devices for electronic books ("e-books")

mini TVs, pocket TVs, devices for playing films, video players radios (including mini and pocket radios), Walkmans, Discmans, music players for e.g. CD, DVD, Blu-ray, cassettes, USB, MP3, headphones cordless telephones, mobile telephones, smart phones, two-way radios, hands-free telephones, devices for summoning people (pagers, bleepers)

mobile defibrillators, blood sugar meters, blood pressure monitors, step counters, pulse meters torches, laser pointers mobile detectors, optical magnifiers, binoculars, night vision devices GPS devices, navigation devices, portable interface devices for satellite communications data storage devices (USB sticks, external hard drives, memory cards)

wristwatches, digital watches, pocket watches, fob watches, stopwatches.

Furthermore, the adhesive tapes furnished with the adhesive of the invention are advantageously suitable for jacketing elongate items such as, in particular, cable harnesses in motor vehicles, where the adhesive tape can be led in a screw line around the elongate item, or the elongate item can be axially sheathed by the tape. Owing to its outstanding suitability, the adhesive tape can be used in a jacket which consists of a covering where the self-adhesively endowed adhesive tape is present in an edge region of the covering at least, the tape being bonded to the covering such that the adhesive tape extends over one of the longitudinal edges of the covering, and does so preferably in an edge region which is narrow in comparison to the width of the covering. A product of this type and also optimized embodiments thereof are disclosed in EP 1 312 097 A1. EP 1 300 452 A2, DE 102 29 527 A1, and WO 2006 108 871 A1 present further developments for which the adhesive tape of the invention is likewise especially suitable. The adhesive tape of the invention may similarly be used in a process as disclosed by EP 1 367 608 A2. Lastly, EP 1 315 781 A1 and also DE 103 29 994 A1 describe adhesive tape embodiments of a kind also possible for the adhesive tape of the invention.

With further preference, the adhesive tape, when bonded to cables with PVC jacketing and to cables with polyolefin jacketing, does not destroy the same when an assembly made up of cables and adhesive tape is stored in accordance with LV 312 at temperatures above 100° C. for up to 3000 h and the cables are subsequently bent around a mandrel. The adhesive tape of the invention is outstandingly suitable for wrapping cables, and can easily be unwrapped for ease of processing, and does not exhibit any or any substantial flagging nor any cable embrittlement even in the case of the high temperature classes T3 and T4 over 3000 h.

Experimental Section

Test Methods

Adhesive tape specimens used were double-sidedly adhesive prototypes comprising a 12 µm polyester film equipped on both sides with a pressure-sensitive adhesive layer 50 µm thick.

Gel Permeation Chromatography GPC (Method A):

The figures for the number-average and weight-average molecular weights $M_n$ and $M_w$ and also the polydispersity PD in this text relate to the determination by gel permeation chromatography. The determination is made on 100 µL of sample having undergone clarifying filtration (sample concentration 4 g/L). The eluent used is tetrahydrofuran with 0.1 vol % of trifluoroacetic acid. Measurement takes place at 25° C. The precolumn used is a column of type PSS-SDV, 5 µm, $10^3$ Å, ID 8.0 mm·50 mm. Separation is carried out using the columns of type PSS-SDV, 5 µm, $10^3$ Å and $10^3$ Å and $10^6$ Å each with ID 8.0 mm×300 mm (columns from Polymer Standards Service; detection using Shodex RI71 differential refractometer). The flow rate is 1.0 mL per minute. Calibration takes places against PMMA standards (polymethyl methacrylate calibration) in the case of the comb polymers and against PS standards (polystyrene calibration) in the case of the hydrocarbon resins.

180° Peel Adhesion Test (Method B):

The peel adhesion to steel is determined under test conditions at 23° C.+/−1° C. temperature and 50%+/−5% relative humidity.

A strip of the adhesive tape specimen 20 mm wide was applied to steel plates which beforehand were washed twice with acetone and once with isopropanol and thereafter were left to stand in the air for 5 minutes to allow the solvent to evaporate. The pressure-sensitive adhesive strip was pressed onto the substrate twice with an applied pressure corresponding to a weight of 2 kg. The adhesive tape was thereafter immediately peeled from the substrate at an angle of 180° and a velocity of 300 mm/min. All measurements were carried out at room temperature.

The measurement results are recorded in N/cm and have been averaged from three measurements.

Reworkability (Method C)

The adhesive tape to be tested, in the form of a 20 mm×150 mm strip, is covered on one of its adhesive sides with a 36 µm thick etched PET film. The strip is adhesively bonded by the other adhesive side to a conditioned polycarbonate plate and the bond is rolled over back and forth once using a 4 kg roller. The assembly is stored at 40° C. for 3 days.

After 3 days, the specimens are removed, conditioned at room temperature (RT) for at least 2 hours, and peeled off manually. The test is carried out under a peel angle of 90° and an evaluation is made of the way in which the adhesive tape fails at a slow peel velocity of 0.1 mm/min. The abbreviations used are as follows:

A: adhesive failure (advantageous; inventively positive test outcome)

C: cohesive failure (not advantageous, inventively negative test outcome)

MF: mixed fracture (not advantageous; inventively negative test outcome)

Microshear Test (Method D)

This test serves for accelerated testing of the shear strength of adhesive tapes under temperature loading.

Sample Preparation for Microshear Test:

Adhesive tape (length about 50 mm, width 10 mm) cut from the respective sample specimen is adhered to a steel test plate, cleaned with acetone, so that the steel plate protrudes beyond the adhesive tape to the right and left and such that the adhesive tape overhangs the test plate at the top by 2 mm. The bond area of the sample is height·width=13 mm·10 mm. The bond side is subsequently rolled over six times with a 2 kg steel roller at a velocity of 10 m/min. The adhesive tape is reinforced flush with a stable adhesive strip, which serves as a support for the travel sensor. The sample is suspended vertically by means of the test plate.

Microshear Test:

The sample specimen under measurement is loaded at the lower end with a weight of 300 g. The test temperature is 40° C., the test duration 30 minutes (15 minutes of loading and 15 minutes of unloading). The shear travel after the specified test duration at constant temperature is the result reported, in µm, in the form of a maximum value ["max": maximum shear travel as a result of 15-minute loading] and as a minimum value ["min"; shear travel ("residual deflection") 15 min after unloading; on unloading there is a backward movement as a result of relaxation]. Likewise reported is the elastic component in percent ["elast"; elastic component= (max−min)·100/max].

Name Plate Test (NPT) (Method E)

An aluminum test strip 2 cm wide, 15 cm long, and 0.5 mm thick is washed with acetone and left to stand for 5 minutes under conditions of 23° C.+/−1° C. temperature and 50%+/−5% relative humidity. The aluminum strip is subsequently applied lengthwise to the adhesive tape specimen. Protruding adhesive tape is then cut off, so that the tape finishes flush with the aluminum plate. A polycarbonate plate (PC plate) 20 cm long, 2.5 cm wide, and 3 mm thick is washed with ethanol and left to stand for 120 minutes under conditions of 23° C.+/−1° C. temperature and 50%+/−5% relative humidity. The assembly made up of the aluminum plate and the adhesive tape is bonded centrally on the PC plate so as to produce the test specimen. Rolling back and forth five times by means of a 4 kg roller and subsequent standing for 72 h ensure a defined adhesive bond. The PC plate is clamped into a 33° NPT frame (FIGS. 1 and 2), so that the ends of the PC plate are fixed flush with the fixing rail on the frame, and the bonded aluminum plate is present visibly directed upward without fixing. The frame is introduced with the into an oven at 50° C. After 48 h, the respective distance between the two ends 2 cm wide of the aluminum test strip is measured at a 90° angle to the PC plate. The measurement result is the sum of both measured distances and is reported in mm. A duplicate determination is carried out and the average is calculated.

The results of measurement are interpreted as follows:

≤5 mm: advantageous

<10 mm: still satisfactory

≥10 mm: not advantageous

EXAMPLES

Characterization of the commercially available chemicals used:

Crosslinkers:

Erisys GA 240: N,N,N',N'-tetrakis(2,3-epoxypropyl)-m-xylene-a,a'-diamine

Emerald Performance Materials

S-610: N,N,N',N'-tetrakis(2,3-epoxypropyl)cyclohexane-1, 3-dimethylamine Synasia Industry & Trade Co Al chelate: Al (III) acetylacetonate Sigma Aldrich Rubber: Kraton D 1118: diblock/triblock 78/22; polystyrene content around 33%; Brookfield viscosity (25° C., 25% in toluene) ~0.6 Pa s; triblock linear SBS Kraton Polymers Resins:

Dertophene T: terpene-phenol resin, softening point around 95° C.; $M_w$ ⋀500-800 g/mol; hydroxyl value 20-50 mg KOH/g

DRT

Dertophene T 110: terpene-phenol resin, softening point around 110° C.; $M_w$~500-800 g/mol; hydroxyl value 40-60 mg KOH/g

DRT

Unless specifically indicated otherwise, all percentages below are percent by weight.

Indicated amounts relating to the composition of the adhesive composed of the polyacrylate component, the optional rubber component and/or the optional resins are based on 100 wt % of the adhesive composed in the total of these components.

Indicated amounts relating to the crosslinker are reported in parts by weight (pbw), based in each case on 100 parts by weight of the polyacrylate component.

Example 1

Preparation of Polyacrylate I

A 300 L reactor conventional for radical polymerizations was charged with 2.0 kg of acrylic acid, 30.0 kg of isobornyl acrylate (BA), 68.0 kg of 2-ethylhexyl acrylate (EHA), and 72.4 kg of benzine/acetone (70:30). After nitrogen gas had been passed through the reactant for 45 minutes with stirring, the reactor was heated up to 58° C. and 50 g of Vazo® 67 were added. The jacket temperature was then raised to 75° C. and the reaction was carried out constantly at this external temperature. After a reaction time of 1 h a further 50 g of Vazo® 67 were added. Dilution took place after 3 h with 20 kg of benzine/acetone (70:30) and after 6 h with 10.0 kg of benzine/acetone (70:30). To reduce the residual initiators, 0.15 kg portions of Perkadox® 16 were added after 5.5 h and after 7 h. The reaction was discontinued after a time of 24 h and the batch was cooled to room temperature. Molar masses by GPC (measurement method A): $M_n$=62 800 g/mol; $M_w$=852 600 g/mol. K value: 62.5.

Finally the crosslinker solution (3 wt % in acetone) was added and coating took place on siliconized release paper using a coating bar on a laboratory coating bench. The coatings were subsequently dried at 120° C. for 15 min. The adhesive layers with a layer thickness of 50 μm were laminated onto a 12 μm PET film, to give a double-sided adhesive tape specimen. The specimens were conditioned for one week under standard conditions (23° C., 50% relative humidity).

The acrylate fraction was 100% (straight polyacrylate system) and crosslinking was carried out using Erisys GA 240 (0.02 pbw based on 100 pbw of polyacrylate).

Example 2

The procedure was analogous to that of example 1. The acrylate fraction was 100% and crosslinking was carried out using Erisys GA 240 (0.03 pbw based on 100 pbw of polyacrylate).

Example 3

The procedure was analogous to that of example 1. The acrylate fraction was 100% and crosslinking was carried out using Erisys GA 240 (0.04 pbw based on 100 pbw of polyacrylate).

Example 4

The procedure was analogous to that of example 1. The acrylate fraction was 100% and crosslinking was carried out using Erisys GA 240 (0.05 pbw based on 100 pbw of polyacrylate).

Example 5

The procedure was analogous to that of example 1. The acrylate fraction was 100% and crosslinking was carried out using Al chelate (0.1 pbw based on 100 pbw of polyacrylate).

Example 6

The procedure was analogous to that of example 1. The acrylate fraction was 100% and crosslinking was carried out using Al chelate (0.2 pbw based on 100 pbw of polyacrylate).

Example 7

The procedure was analogous to that of example 1. The acrylate fraction was 100% and crosslinking was carried out using Al chelate (0.3 pbw based on 100 pbw of polyacrylate).

Example 8

The procedure was analogous to that of example 1. The acrylate fraction was 100% and crosslinking was carried out using Al chelate (0.4 pbw based on 100 pbw of polyacrylate).

Example 9

The procedure was analogous to that of example 1. The acrylate fraction was 100% and crosslinking was carried out using 0.04 pbw of Erisys GA 240 and 0.15 pbw of Al chelate (based on 100 pbw of polyacrylate).

Example 10

The procedure was analogous to that of example 1. The acrylate fraction was 100% and crosslinking was carried out using 0.03 pbw of Erisys GA 240 and 0.02 pbw of Al chelate (based on 100 pbw of polyacrylate).

Example 11

The procedure was analogous to that of example 1. The acrylate fraction was 100% and crosslinking was carried out using 0.03 pbw of Erisys GA 240 and 0.055 pbw of Al chelate (based on 100 pbw of polyacrylate).

Example 12

The procedure was analogous to that of example 1. The acrylate fraction was 100% and crosslinking was carried out using 0.025 pbw of Erisys GA 240 and 0.05 pbw of Al chelate (based on 100 pbw of polyacrylate).

Example 13

The procedure was analogous to that of example 1. The acrylate fraction was 100% and crosslinking was carried out using 0.03 pbw of Erisys GA 240 and 0.075 pbw of Al chelate (based on 100 pbw of polyacrylate).

Example 14

The procedure was analogous to that of example 1. The acrylate fraction was 100% and crosslinking was carried out using 0.02 pbw of Erisys GA 240 and 0.075 pbw of Al chelate (based on 100 pbw of polyacrylate).

Example 15

Preparation of Polyacrylate II

A conventional 2 L glass reactor suitable for radical polymerizations with evaporative cooling was charged with 300 g of a monomer mixture containing 142.5 g of butyl acrylate, 142.5 g of ethylhexyl acrylate, and 15 g of acrylic acid, and with 200 g of acetone: special-boiling-point spirit 60/95 (1:1). After nitrogen gas had been passed through the reactor for 45 minutes with stirring, the reactor was heated up to 58° C. and 0.15 g of 2,2'-azodi(2-methylbutyronitrile) (Vazo® 67, from DuPont), in solution in 6 g of acetone, was added. Thereafter the external heating bath was heated to 75° C. and the reaction was carried out constantly at this external temperature. After a reaction time of 1 h a further 0.15 g of Vazo® 67, in solution in 6 g of acetone, was added. After 3 h, dilution took place with 90 g of special-boiling-point spirit 60/95.

After a reaction time of 5:30 hours, 0.45 g of bis(4-tert-butylcyclohexanyl) peroxidicarbonate (Perkadox® 16, from Akzo Nobel), in solution in 9 g of acetone, was added. After a reaction time of 7 h a further 0.45 g of bis(4-tert-butylcyclohexanyl) peroxidicarbonate (Perkadox® 16, from Akzo Nobel), in solution in 9 g of acetone, was added. After a reaction time of 10 h, dilution took place with 90 g of special-boiling-point spirit 60/95. The reaction was discontinued after a reaction time of 24 h and the batch was cooled to room temperature.

Molar masses by GPC (measurement method A): $M_n$ 98 000 g/mol; $M_w$=1 100 000 g/mol) The polyacrylate solution obtained as described above (polyacrylate: 47.5% 2-ethylhexyl acrylate, 47.5% n-butyl acrylate, 5% acrylic acid, $M_n$=98 000 g/mol; $M_w$=1 100 000 g/mol) was admixed with the desired amount of resin and diluted with a 70:30 benzine: acetone solvent mixture so as to result in a final solids content of 35 wt % and dissolved on a roller bed for 12 h. Finally the crosslinker solution (3 wt % in acetone) was added and coating took place on a siliconized release paper using a coating bar on a laboratory coating bench. The coatings were subsequently dried at 120° C. for 15 min. The adhesive layers with a layer thickness of 50 μm were laminated onto a 12 μm PET film so as to give a double-sided adhesive tape specimen. The specimens were conditioned for one week under standard conditions (23° C., 50% relative humidity).

The acrylate fraction was 60% (based on the composition of the components of the adhesive; see above) and crosslinking took place with Erisys GA 240 (0.03 pbw, based on 100 pbw of polyacrylate). The resin component used was Dertophene T at 40% (based on the composition of the components of the adhesive; see above).

Example 16

The procedure was analogous to that of example 15. The acrylate fraction was 60% and the resin component was 40%. Crosslinking was carried out with 0.04 pbw of Erisys GA 240 (based on 100 pbw of polyacrylate).

Example 17

The procedure was analogous to that of example 15. The acrylate fraction was 60% and the resin component was 40%. Crosslinking was carried out with 0.05 pbw of Erisys GA 240 (based on 100 pbw of polyacrylate).

Example 18

The procedure was analogous to that of example 15. The acrylate fraction was 60% and the resin component was 40%. Crosslinking was carried out with 0.2 pbw of Al chelate (based on 100 pbw of polyacrylate).

Example 19

The procedure was analogous to that of example 15. The acrylate fraction was 60% and the resin component was 40%. Crosslinking was carried out with 0.3 pbw of Al chelate (based on 100 pbw of polyacrylate).

Example 20

The procedure was analogous to that of example 15. The acrylate fraction was 60% and the resin component was 40%. Crosslinking was carried out with 0.04 pbw of Erisys GA 240 and 0.05 pbw of Al chelate (based on 100 pbw of polyacrylate).

Example 21

The procedure was analogous to that of example 15. The acrylate fraction was 60% and the resin component was 40%. Crosslinking was carried out with 0.035 pbw of Erisys GA 240 and 0.075 pbw of Al chelate (based on 100 pbw of polyacrylate).

Example 22

The procedure was analogous to that of example 15. The acrylate fraction was 60% and the resin component was 40%. Crosslinking was carried out with 0.035 pbw of Erisys GA 240 and 0.01 pbw of Al chelate (based on 100 pbw of polyacrylate).

Example 23

The procedure was analogous to that of example 15. The acrylate fraction was 60% and the resin component was 40%. Crosslinking was carried out with 0.02 pbw of Erisys GA 240 and 0.15 pbw of Al chelate (based on 100 pbw of polyacrylate).

Example 24

Preparation of Polyacrylate II

A conventional 2 L glass reactor suitable for radical polymerizations with evaporative cooling was charged with 300 g of a monomer mixture containing 142.5 g of butyl acrylate, 142.5 g of ethylhexyl acrylate, and 15 g of acrylic acid, and with 200 g of acetone: special-boiling-point spirit 60/95 (1:1). After nitrogen gas had been passed through the reactor for 45 minutes with stirring, the reactor was heated up to 58° C. and 0.15 g of 2,2'-azodi(2-methylbutyronitrile) (Vazo® 67, from DuPont), in solution in 6 g of acetone, was added. Thereafter the external heating bath was heated to 75° C. and the reaction was carried out constantly at this external temperature. After a reaction time of 1 h a further 0.15 g of Vazo® 67, in solution in 6 g of acetone, was added. After 3 h, dilution took place with 90 g of special-boiling-point spirit 60/95.

After a reaction time of 5:30 hours, 0.45 g of bis(4-tert-butylcyclohexanyl) peroxidicarbonate (Perkadox® 16, from Akzo Nobel), in solution in 9 g of acetone, was added. After a reaction time of 7 h a further 0.45 g of bis(4-tert-butylcyclohexanyl) peroxidicarbonate (Perkadox® 16, from Akzo Nobel), in solution in 9 g of acetone, was added. After a reaction time of 10 h, dilution took place with 90 g of special-boiling-point spirit 60/95. The reaction was discontinued after a reaction time of 24 h and the batch was cooled to room temperature.

Molar masses by GPC (measurement method A): $M_n$ 98 000 g/mol; $M_w$=1 100 000 g/mol)

The at least two-phase adhesive was prepared as follows: first of all a stock solution of the synthetic rubber was prepared. The solids content was 35 wt % and the solvent mixture used was 70:30 special-boiling-point spirit 60/95: acetone (special-boiling-point spirit 60/95 referred to below simply as "benzine"). A polyacrylate solution was added to the desired fraction of stock solution. The polyacrylate solution obtained as described above (polyacrylate: 47.5% 2-ethylhexyl acrylate, 47.5% n-butyl acrylate, 5% acrylic acid, $M_n$=98 000 g/mol; $M_w$=1 100 000 g/mol) was admixed with the desired amount of resin and diluted with a 70:30 benzine:acetone solvent mixture so as to result in a final solids content of 35 wt % and dissolved on a roller bed for 12 h. Finally the crosslinker solution (3 wt % in acetone) was added and coating took place on a siliconized release paper using a coating bar on a laboratory coating bench. The coatings were subsequently dried at 120° C. for 15 min. The adhesive layers with a layer thickness of 46 µm were laminated onto a 12 µm PET film so as to give a double-sided adhesive tape specimen. The specimens were conditioned for one week under standard conditions (23° C., 50% relative humidity).

The acrylate fraction was 42.5% (based on the composition of the components of the adhesive; see above) and crosslinking took place with Al chelate (0.1 pbw, based on 100 pbw of polyacrylate). As a second polymer component, Kraton D1118 was used at 20% (based on the composition of the components of the adhesive; see above). The resin component used was Dertophene T at 37.5% (based on the composition of the components of the adhesive; see above).

Example 25

The procedure was analogous to that of example 24. The acrylate fraction was 42.5%, the resin component 37.5%, and the second polymer component Kraton D1118 20%. Crosslinking was carried out with 0.02% of Al chelate (based on the polyacrylate).

Example 26

The procedure was analogous to that of example 24. The acrylate fraction was 42.5%, the resin component 37.5%, and the second polymer component Kraton D1118 20%. Crosslinking was carried out with 0.03 pbw of Al chelate (based on 100 pbw of polyacrylate).

Example 27

The procedure was analogous to that of example 24. The acrylate fraction was 42.5%, the resin component 37.5%, and the second polymer component Kraton D1118 20%. Crosslinking was carried out with 0.04 pbw of Erisys GA 240 and 0.05 pbw of Al chelate (based on 100 pbw of polyacrylate).

Example 28

The procedure was analogous to that of example 24. The acrylate fraction was 42.5%, the resin component 37.5%, and the second polymer component Kraton D1118 20%. Crosslinking was carried out with 0.035 pbw of Erisys GA 240 and 0.075 pbw of Al chelate (based on 100 pbw of polyacrylate).

Example 29

The procedure was analogous to that of example 24. The acrylate fraction was 42.5%, the resin component 37.5%, and the second polymer component Kraton D1118 20%. Crosslinking was carried out with 0.035 pbw of Erisys GA 240 and 0.1 pbw of Al chelate (based on 100 pbw of polyacrylate).

Example 30

The procedure was analogous to that of example 24. The acrylate fraction was 42.5%, the resin component 37.5%, and the second polymer component Kraton D1118 20%. Crosslinking was carried out with 0.02 pbw of Erisys GA 240 and 0.15 pbw of Al chelate (based on 100 pbw of polyacrylate).

Example 31

The procedure was analogous to that of example 24. The acrylate fraction was 42.5%, the resin component 37.5%, and the second polymer component Kraton D1118 20%. Crosslinking was carried out with 0.02 pbw of Erisys GA 240 and 0.2 pbw of Al chelate (based on 100 pbw of polyacrylate).

Example 32

The procedure was analogous to that of example 24. The acrylate fraction was 42.5%, the resin component 37.5%, and the second polymer component Kraton D1118 20%. Crosslinking was carried out with 0.01 pbw of Erisys GA 240 and 0.02 pbw of Al chelate (based on 100 pbw of polyacrylate).

Example 33

Preparation of Polyacrylate III

A conventional 2 L glass reactor suitable for radical polymerizations with evaporative cooling was charged with 300 g of a monomer mixture containing 148.5 g of butyl acrylate, 148.5 g of ethylhexyl acrylate, and 3 g of acrylic acid, and with 165 g of acetone: special-boiling-point spirit 60/95 (1:1). After nitrogen gas had been passed through the reactor for 45 minutes with stirring, the reactor was heated up to 58° C. and 0.15 g of 2,2'-azodi(2-methylbutyronitrile) (Vazo® 67, from DuPont), in solution in 6 g of acetone, was added. Thereafter the external heating bath was heated to 75° C. and the reaction was carried out constantly at this external temperature. After a reaction time of 1 h a further 0.15 g of Vazo® 67, in solution in 6 g of acetone, was added. After 3 h, dilution took place with 90 g of special-boiling-point spirit 60/95.

After a reaction time of 5:30 hours, 0.45 g of bis(4-tert-butylcyclohexanyl) peroxidicarbonate (Perkadox® 16, from Akzo Nobel), in solution in 9 g of acetone, was added. After a reaction time of 7 h a further 0.45 g of bis(4-tert-butylcyclohexanyl) peroxidicarbonate (Perkadox® 16, from Akzo Nobel), in solution in 9 g of acetone, was added. After a reaction time of 10 h, dilution took place with 90 g of special-boiling-point spirit 60/95. The reaction was discontinued after a reaction time of 24 h and the batch was cooled to room temperature.

Molar masses by GPC: $M_n$=90 000 g/mol; $M_w$ 1 200 000 g/mol)

The polyacrylate solution obtained as described above (polyacrylate: 49.5% 2-ethylhexyl acrylate, 49.5% n-butyl acrylate, 1% acrylic acid, $M_n$=90 000 g/mol; $M_w$=1 200 000 g/mol) was admixed with the desired amount of resin and diluted with a 70:30 benzine:acetone solvent mixture so as to result in a final solids content of 35 wt % and dissolved on a roller bed for 12 h. Finally the crosslinker solution (3 wt % in acetone) was added and coating took place on a siliconized release paper using a coating bar on a laboratory coating bench. The coatings were subsequently dried at 120° C. for 15 min. The adhesive layers with a layer thickness of 50 μm were laminated onto a 12 μm PET film so as to give a double-sided adhesive tape specimen. The specimens were conditioned for two weeks under standard conditions (23° C., 50% relative humidity).

The acrylate fraction was 70% (based on the composition of the components of the adhesive; see above) and crosslinking took place with S-610 (0.04 pbw, based on the polyacrylate). The resin component used was Dertophene T 110 at 30% (based on the composition of the components of the adhesive; see above).

Example 34

The procedure was analogous to that of example 33. The acrylate fraction was 70% and the resin component was 30%. Crosslinking was carried out with 0.025 pbw of S-610 and 0.055 pbw of Al chelate (based on 100 pbw of polyacrylate).

Example 35

The procedure was analogous to that of example 33. The acrylate fraction was 70% and the resin component was 30%. Crosslinking was carried out with 0.055 pbw of S-610 and 0.095 pbw of Al chelate (based on 100 pbw of polyacrylate).

Example 36

The procedure was analogous to that of example 33. The acrylate fraction was 70% and the resin component was 30%. Crosslinking was carried out with 0.02 pbw of S-610 and 0.075 pbw of Al chelate (based on 100 pbw of polyacrylate).

Example 37

The procedure was analogous to that of example 33. The acrylate fraction was 70% and the resin component was 30%. Crosslinking was carried out with 0.02 pbw of S-610 and 0.045 pbw of Al chelate (based on 100 pbw of polyacrylate).

Results

| Example | Fraction of Erisys GA 240 [pbw] | Fraction of Al chelate [pbw] | Molar ratio Erisys GA 240:Al chelate | NPT (Method E) [mm] | Microshear test (method D) max [μm] | Microshear test (Method D) elast. [%] | Peel adhesion [N/cm] (Method B) | Reworkability (Method C) |
|---|---|---|---|---|---|---|---|---|
| 1 | 0.02 | | | 24 | 595 | 32 | 8 | C |
| 2 | 0.03 | | | 5 | 344 | 43 | 7.5 | MB |
| 3 | 0.04 | | | 3 | 244 | 44 | 7.4 | MB |
| 4 | 0.05 | | | 25 | 213 | 65 | 7.6 | A |
| 5 | | 0.1 | | 14 | 264 | 37 | 7.4 | C |
| 6 | | 0.2 | | 22 | 160 | 48 | 7.3 | MB |
| 7 | | 0.3 | | 37 | 90 | 54 | 6.9 | MB |
| 8 | | 0.4 | | 40 | 37 | 60 | 7.3 | A |
| *9* | *0.04* | *0.15* | *1:4.2* | *9* | *223* | *71* | *7.2* | *A* |
| 10 | 0.03 | 0.02 | 1:0.7 | 10 | 274 | 61 | 7.7 | A |
| 11 | 0.03 | 0.055 | 1:2 | 5 | 208 | 60 | 7.2 | A |
| 12 | 0.025 | 0.05 | 1:2.2 | 4 | 294 | 52 | 7.1 | A |
| 13 | 0.03 | 0.075 | 1:2.8 | 3 | 209 | 67 | 7.6 | A |
| *14* | *0.02* | *0.075* | *1:4.2* | *8* | *201* | *66* | *7.3* | *A* |
| 15 | 0.03 | | | 4 | 1646 | 35 | 14.1 | C |
| 16 | 0.04 | | | 8 | 1041 | 54 | 13.5 | MB |
| 17 | 0.05 | | | 25 | 719 | 69 | 12.8 | A |
| 18 | | 0.2 | | 36 | 526 | 78 | 12.7 | A |
| 19 | | 0.3 | | 34 | 385 | 77 | 13 | A |
| *20* | *0.04* | *0.05* | *1:1.4* | *7* | *433* | *59* | *12.9* | *A* |
| 21 | 0.035 | 0.075 | 1:2.4 | 3 | 512 | 58 | 13.2 | A |
| 22 | 0.035 | 0.1 | 1:3.7 | 4 | 728 | 67 | 12.2 | A |
| 23 | 0.02 | 0.15 | 1:8.3 | 27 | 469 | 77 | 13.3 | A |

-continued

| Example | Fraction of Erisys GA 240 [pbw] | Fraction of Al chelate [pbw] | Molar ratio Erisys GA 240:Al chelate | NPT (Method E) [mm] | Microshear test (method D) max [µm] | Microshear test (Method D) elast. [%] | Peel adhesion [N/cm] (Method B) | Reworkability (Method C) |
|---|---|---|---|---|---|---|---|---|
| 24 |  | 0.1 |  | 31 | 281 | 31 | 11.3 | C |
| 25 |  | 0.2 |  | 2 | 195 | 44 | 11.3 | MB |
| 26 |  | 0.3 |  | 18 | 81 | 64 | 10.7 | A |
| *27* | *0.04* | *0.05* | *1:1.4* | *8* | *264* | *57* | *10.9* | *A* |
| 28 | 0.035 | 0.075 | 1:2.4 | 3 | 278 | 59 | 10.9 | A |
| 29 | 0.035 | 0.1 | 1:3.7 | 5 | 226 | 63 | 11.4 | A |
| 30 | 0.02 | 0.15 | 1:8.3 | 3 | 234 | 48 | 11.2 | MB |
| 31 | 0.02 | 0.2 | 1:11.1 | 7 | 241 | 53 | 11.4 | MB |
| 32 | 0.01 | 0.02 | 1:2.2 | 8 | 269 | 38 | 11.8 | MB |
| 33 | 0.04 |  |  | 40 | 148 | 80 | 9.8 | A |
| 34 | 0.025 | 0.055 | 1:2.5 | 2 | 158 | 65 | 10.1 | A |
| 35 | 0.055 | 0.095 | 1:2.0 | 36 | 71 | 73 | 9.6 | A |
| *36* | *0.02* | *0.075* | *1:4.2* | *9* | *87* | *72* | *9.8* | *A* |
| 37 | 0.02 | 0.045 | 1:2.5 | 0 | 219 | 66 | 9.8 | A |

Examples good in accordance with the invention (marked by bold text):
11, 12, 13, 21, 22, 28, 29, 34, 37
Examples satisfactory in accordance with the invention (marked by italics/underlining):
9, 14, 20, 27, 36
Counter-examples (do not meet the requirements imposed in accordance with the invention):
1 to 8, 10, 15 to 19, 23 to 26, 30 to 33, 35

Pressure sensitive adhesives in the known prior art are adjusted to a required cohesive strength with only in each case one covalent crosslinker, used singularly, or alternatively with one coordinative crosslinker, used singularly. By these means, however, it is not possible to fully realize the requisite profile of requirements. Through the amount of crosslinker used it is possible to adjust the repulsion resistance (according to Method E) of the PSA. As examples 1-4 show, the repulsion resistance can be partially optimized for 100% acrylate compositions using a covalent crosslinker (Ex. 2 and 3). The "elast." component in a microshear test (Method D), however, is only 48% and 49% for the stated examples 2 and 3, respectively (see third column from left in the tables), resulting in a mixed fracture with residues of adhesive in the reworkability test (Method C). Required in accordance with the invention here, however, are adhesive fractures, which are marked with a "A" in the right-hand column of the tables. The cohesive strength of these examples is therefore not sufficient to ensure residue-free removal of adhesive tapes after use. Consequently the elastic component "elast" required in the microshear test is at least 50%.

It is further apparent from the results from examples 5 to 8 that with a singular coordinative crosslinker it is impossible to obtain sufficient repulsion resistance.

From the results of examples 15-19, 24 to 26 and 33 it can be seen that even in the case of resin-modified polyacrylates, or even, additionally, through mixing with further elastomers, the fundamentally comparable behavior shows through. By varying the sole covalent crosslinker present or, alternatively, the sole coordinative crosslinker present, an improvement in the repulsion resistance is obtainable only if the cohesive strength is lowered to a disadvantageous level, at which there are residues in the reworkability test. Without this having been foreseeable, the objective posed in accordance with the invention is achieved by an adhesive which includes a crosslinker system comprising at least one covalent and at least one coordinative crosslinker. The ratio of the two types of crosslinker to one another is preferably favorably selected.

As shown by examples 11 to 13, 21 to 22, 28 to 29, 34 and 37, an adhesive with a combination of the covalent and the coordinative crosslinkers is able to achieve an improvement in the repulsion resistance, and at the same time a cohesive strength for good reworkability is attainable.

The fraction of the covalent crosslinker in the case of the specimens at least satisfactory in accordance with the invention is between 0.015 and 0.04% parts by weight of crosslinker per 100 parts by weight of the polyacrylate component of the respective adhesive, whereas the fraction of the coordinative crosslinker is 0.03 and 0.15 part by weight. For particularly good results, the fraction of the covalent crosslinker was between 0.02 and 0.035%; the fraction of the coordinative crosslinker between 0.04 and 0.1 part by weight.

Surprisingly for the skilled person, an optimum was found in the molar ratio of covalent crosslinkers to coordinative crosslinkers—that is, the ratio of the amount of substance $n_{cov}$ of the covalent crosslinkers used to the amount of substance $n_{coord}$ of the metal atom of the coordinative crosslinker used. This ratio was in the range between 1:1.3 to 1:1.45; in the optimized range, from 1:2 to 1:4.

Deviating from the quantities described above or from the optimum ratio described leads either to a result in the name plate test of more than 10 mm—with particularly good examples, indeed, being understood as those with a value of 5 mm or less—and hence not sufficiently desired repulsion resistance, or leads to an inadequate cohesive strength of the adhesive. This is demonstrated by examples 10, 23, 30 to 32 and 35.

The invention claimed is:
1. A crosslinkable adhesive comprising
   at least one first polyacrylate having functional groups suitable for covalent crosslinking and for coordinative crosslinking,
   at least one covalent crosslinker,
   and at least one coordinative crosslinker,
   wherein
   the coordinative crosslinker is present in a molar excess over the covalent crosslinker;
   the covalent crosslinkers are present in a total amount of 0.015 to 0.04 parts by weight, based on 100 parts by weight of the polyacrylate;

the coordinative crosslinkers are present in a total amount of 0.03 to 0.15 part by weight, based on 100 parts by weight of the polyacrylate; and the molar ratio of covalent crosslinkers to coordinative crosslinkers is in the range from 1:1.3 to 1:4.5.

2. The crosslinkable adhesive as claimed in claim 1, wherein said crosslinkable adhesive is a pressure sensitive adhesive.

3. The crosslinkable adhesive as claimed in claim 1, wherein the molar ratio of covalent crosslinkers to coordinative crosslinkers is in the range from to 1:2 to 1:4.

4. The crosslinkable adhesive as claimed in claim 1, wherein the covalent crosslinkers used are polyfunctional glycidylamines, polyfunctional epoxides, polyfunctional aziridines, polyfunctional isocyanates, or combinations thereof.

5. The crosslinkable adhesive as claimed in claim 4, wherein the covalent crosslinkers are selected from the group consisting of N,N,N',N'-tetrakis(2,3-epoxypropyl)cyclohexane-1,3-dimethylamine, N,N,N',N'-tetrakis(2,3-epoxypropyl)-m-xylene-a,a'-diamine, 2,2-bis(hydroxymethyl)-1,3-propanediol, (3,4-epoxycyclohexane)methyl 3,4-epoxycyclohexylcarboxylate, trimethylolpropane tris(2-methyl-1-aziridinepropionate), tolylene diisocyanate (TDI), 2,4-tolylene diisocyanate dimer, naphthylene 1,5-diisocyanate (NDI), o-tolylene diisocyanate (TODI), diphenylmethane diisocyanate (MDI), triphenylmethane triisocyanate, tris (p-isocyanatophenyl) thiophosphate and polymethylenepolyphenyl isocyanate.

6. The crosslinkable adhesive as claimed in claim 1, wherein the coordinative crosslinkers are polyvalent metal chelate compounds.

7. The crosslinkable adhesive as claimed in claim 3, wherein Al(III), Zr(IV), or Ti(IV) chelate compounds, or combinations thereof, are selected as coordinative crosslinkers.

8. The crosslinkable adhesive as claimed in claim 1, consisting of:
(a) at least the first base component having
  (a1) as first polymer component, a base polymer component composed of a homopolymer, a copolymer, or a homogeneous mixture of two or more homopolymers, two or more copolymers, or one or more homopolymers with one or more copolymers,
    with at least one of the homopolymers or at least one of the copolymers of the base polymer component having functional groups for crosslinking,
  (a2) optionally further constituents, homogeneously miscible with or soluble in the base polymer component,
(b) optionally a second component having
  (b1) polymers not homogeneously miscible with the base polymer,
  (b2) optionally further constituents not homogeneously miscible with and not soluble in the base polymer, with such further constituents being wholly or partly homogeneously miscible with the optional further polymer component (b);
(c) crosslinkers
  (c1) at least the one covalent crosslinker,
  (c2) at least the one coordinative crosslinker,
and
(d) optionally solvents or solvent residues.

9. The crosslinkable adhesive of claim 1, wherein functional groups for covalent crosslinking and for coordinative crosslinking, acid groups are utilized.

10. A crosslinked adhesive obtainable by crosslinking the crosslinkable adhesive of claim 1.

11. The crosslinked adhesive as claimed in claim 10, wherein the maximum shear travel "max" in the microshear travel test (method), under the measuring conditions specified therein, on repeated microshear travel measurement, changes by not more than 5% within a period of 48 hours when the adhesive is stored at room temperature (23° C.) under otherwise standard conditions.

12. The crosslinkable adhesive of claim 7, wherein the coordinative crosslinker is Al(III) acetylacetonate.

* * * * *